(12) United States Patent
Nanri et al.

(10) Patent No.: US 9,198,177 B2
(45) Date of Patent: Nov. 24, 2015

(54) NETWORK MANAGEMENT DEVICE, BASE STATION DEVICE AND NETWORK MANAGEMENT METHOD

(75) Inventors: Masahiko Nanri, Kanagawa (JP); Jifeng Li, Kanagawa (JP); Yoshiharu Ohsaki, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 122 days.

(21) Appl. No.: 13/817,704

(22) PCT Filed: Jun. 29, 2011

(86) PCT No.: PCT/JP2011/003707
§ 371 (c)(1),
(2), (4) Date: Feb. 19, 2013

(87) PCT Pub. No.: WO2012/023230
PCT Pub. Date: Feb. 23, 2012

(65) Prior Publication Data
US 2013/0148620 A1 Jun. 13, 2013

(30) Foreign Application Priority Data
Aug. 20, 2010 (JP) ................................ 2010-185214

(51) Int. Cl.
*H04W 72/04* (2009.01)
*H04W 74/00* (2009.01)
(Continued)

(52) U.S. Cl.
CPC ....... *H04W 72/0433* (2013.01); *H04J 11/0056* (2013.01); *H04L 5/0053* (2013.01);
(Continued)

(58) Field of Classification Search
None
See application file for complete search history.

(56) References Cited

U.S. PATENT DOCUMENTS 7,961,696 B2 * 6/2011 Ma .......................... H04B 7/02
370/344
8,406,182 B2 * 3/2013 Tiirola .................. H04W 72/04
370/329
(Continued)

FOREIGN PATENT DOCUMENTS

JP 2007-306188 11/2007
WO 2009/064700 5/2009
WO 2009-075631 6/2009

OTHER PUBLICATIONS

MediaTek, Inc, "Inter-cell Interference Mitigation between PRACH and PUCCH/PUSCH in Heterogeneous Networks", 3GPP TSG RAN WG1 Meeting #61bis, R1-103574, Jun. 28-Jul. 2, 2010, pp. 1-4.*

(Continued)

*Primary Examiner* — Ayaz Sheikh
*Assistant Examiner* — Faiyazkhan Ghafoerkhan
(74) *Attorney, Agent, or Firm* — Dickinson Wright PLLC

(57) ABSTRACT

Provided is a network management device capable of suppressing interference of a preamble between cells while securing a predetermined resource. An FGW (500) as the device is a network management device for managing a plurality of base station devices each of which perform communication with communication terminal devices by the SC-FDMA method, wherein the FGW (500) is provided with a parameter determination unit (530) for determining parameters related to an uplink preamble with respect to at least one among the plurality of base station devices, and a parameter notification unit (540) for sending notifications of the determined parameters to the base station devices for which the parameters have been determined; wherein the parameter determination unit (530) determines the parameters so that transmitted sequences of the preamble do not overlap between at least two of the plurality of base station devices.

7 Claims, 23 Drawing Sheets

(51) Int. Cl.
*H04L 27/26* (2006.01)
*H04J 11/00* (2006.01)
*H04W 84/04* (2009.01)
*H04L 5/00* (2006.01)

(52) U.S. Cl.
CPC ............ *H04L5/0073* (2013.01); *H04L 27/261* (2013.01); *H04L 27/2636* (2013.01); *H04W 74/006* (2013.01); *H04L 5/0048* (2013.01); *H04W 84/045* (2013.01)

(56) References Cited

U.S. PATENT DOCUMENTS

| | | | | |
|---|---|---|---|---|
| 8,615,266 | B2* | 12/2013 | Bonneville et al. ............ | 455/522 |
| 8,638,719 | B2* | 1/2014 | Doppler .............. | H04J 11/0053 370/328 |
| 8,649,269 | B2* | 2/2014 | Monogioudis ........ | H04L 47/822 370/238 |
| 8,660,600 | B2* | 2/2014 | Khandekar et al. ........... | 455/522 |
| 8,670,432 | B2* | 3/2014 | Luo ................ | 370/345 |
| 2004/0052319 | A1* | 3/2004 | Wakamatsu ......... | H04L 27/2656 375/343 |
| 2004/0246998 | A1* | 12/2004 | Ma ..................... | H04J 11/0069 370/527 |
| 2007/0047433 | A1* | 3/2007 | Kao .................... | H04L 27/2675 370/208 |
| 2007/0249363 | A1* | 10/2007 | Amalfitano ....... | H04W 72/1231 455/453 |
| 2007/0265002 | A1* | 11/2007 | Machida .............. | H04W 72/02 455/435.1 |
| 2007/0291696 | A1* | 12/2007 | Zhang ................. | H04L 27/2613 370/331 |
| 2008/0062935 | A1* | 3/2008 | Nakagawa .............. | H04L 7/042 370/335 |
| 2008/0068217 | A1* | 3/2008 | Van Wyk ............... | H04L 7/042 340/870.11 |
| 2008/0096543 | A1* | 4/2008 | Sundararajan ........ | H04W 24/00 455/424 |
| 2008/0130722 | A1* | 6/2008 | Choi ..................... | H04B 1/713 375/150 |
| 2008/0144756 | A1* | 6/2008 | Park .................... | H04B 1/7075 375/359 |
| 2008/0181174 | A1* | 7/2008 | Cho .................... | H04B 7/0857 370/329 |
| 2008/0232516 | A1* | 9/2008 | Cheng ................. | H04L 5/023 375/344 |
| 2008/0267134 | A1* | 10/2008 | Cheng ................. | H04W 56/00 370/335 |
| 2009/0135761 | A1 | 5/2009 | Khandekar | |
| 2009/0197630 | A1* | 8/2009 | Ahn ..................... | H04L 1/0029 455/522 |
| 2009/0201867 | A1* | 8/2009 | Teo ..................... | H04L 5/0037 370/329 |
| 2009/0264077 | A1* | 10/2009 | Damnjanovic ...... | H04W 52/244 455/63.1 |
| 2010/0067472 | A1* | 3/2010 | Ball ..................... | H04L 5/0053 370/329 |
| 2010/0173612 | A1* | 7/2010 | Khanfouci ............ | H04W 16/16 455/412.1 |
| 2010/0195619 | A1* | 8/2010 | Bonneville ............ | H04W 52/40 370/331 |
| 2010/0197338 | A1* | 8/2010 | Bonneville .......... | H04W 52/244 455/522 |
| 2010/0232318 | A1* | 9/2010 | Sarkar .................. | H04W 28/18 370/254 |
| 2010/0234061 | A1* | 9/2010 | Khandekar ......... | H04W 52/146 455/522 |
| 2010/0260079 | A1 | 10/2010 | Baldemair | |
| 2010/0265854 | A1 | 10/2010 | Baldemair | |
| 2010/0278063 | A1* | 11/2010 | Kim ..................... | H04L 5/0073 370/252 |
| 2010/0322227 | A1* | 12/2010 | Luo ........................ | H04B 7/024 370/345 |
| 2011/0044391 | A1* | 2/2011 | Ji .......................... | H04L 5/0007 375/260 |
| 2011/0105135 | A1* | 5/2011 | Krishnamurthy ..... | H04W 16/10 455/450 |
| 2011/0188481 | A1* | 8/2011 | Damnjanovic ........ | H04W 72/04 370/336 |
| 2011/0195719 | A1* | 8/2011 | Chmiel ................ | H04J 11/0069 455/450 |
| 2011/0211514 | A1* | 9/2011 | Hamalainen ...... | H04W 52/0232 370/311 |
| 2011/0230198 | A1* | 9/2011 | Phan ................... | H04W 92/20 455/450 |
| 2011/0255486 | A1* | 10/2011 | Luo ...................... | H04W 48/12 370/329 |
| 2011/0292816 | A1* | 12/2011 | Lee ...................... | H04W 16/24 370/252 |
| 2012/0033570 | A1* | 2/2012 | He .......................... | H04L 5/001 370/252 |
| 2012/0046028 | A1* | 2/2012 | Damnjanovic ........ | H04W 24/02 455/423 |
| 2012/0176885 | A1* | 7/2012 | Lee ..................... | H04J 13/0048 370/209 |
| 2012/0178482 | A1* | 7/2012 | Seo ...................... | H04W 56/00 455/501 |
| 2012/0258724 | A1* | 10/2012 | Kim .................... | H04W 72/082 455/452.2 |

OTHER PUBLICATIONS

International Search Report dated Oct. 4, 2011.
3GPP TS 36.211 V8.9.0, "3rd Generation Partnership Project; Technical Specification Group Radio Access Network; Evolved Universal Terrestrial Radio Access (E-UTRA); Physical Channels and Modulation (Release 8)," Dec. 2009, pp. 1-83, p. 3, Line 7.
3GPP TSG RAN WG1 Meeting #61bis, "Inter-cell Interference Mitigation between PRACH and PUCCH/PUSCH in Heterogeneous Networks," R1-103574, Jun. 28-Jul. 2, 2010, pp. 1-4, p. 3, Line 9.
English Translation of Search Report which is an annex to Chinese Office Action dated May 22, 2015.

* cited by examiner

| PARAMETER TYPEs | PRACH PARAMETERs m | PRACH PARAMETERs h1 | PRACH PARAMETERs h2 |
|---|---|---|---|
| TRANSMISSION TIMING VALUE | 0 | 0 | 0 |
| LOGICAL SEQUENCE NUMBER | 30 | 32 | 33 |
| Ncs CONFIGURATION VALUE | 5 | 1 | 1 |
| HIGH SPEED FLAG | 0 | 0 | 0 |
| FREQUENCY STARTING NUMBER | 3 | 3 | 3 |

FIG.5

| PARMETER TYPEs | MeNB | FIRST HeNB | SECOND HeNB |
|---|---|---|---|
| $N_{ZC}$ | 839 | 839 | 839 |
| $N_{CS}$ | 26 | 13 | 13 |
| u | 80, 759 | 42 | 797 |

FIG.6

| PARAMETER TYPEs | PRACH PARAMETERs m | PRACH PARAMETERs h1 | PRACH PARAMETERs h2 |
| --- | --- | --- | --- |
| TRANSMISSION TIMING VALUE | 0 | 0 | 0 |
| LOGICAL SEQUENCE NUMBER | 30 | 30 | 33 |
| $N_{CS}$ CONFIGURATION VALUE | 5 | 1 | 1 |
| HIGH SPEED FLAG | 0 | 0 | 0 |
| FREQUENCY STARTING NUMBER | 3 | 9 | 9 |

FIG.15

| PARMETER TYPEs | MeNB | FIRST HeNB | SECOND HeNB |
|---|---|---|---|
| $N_{ZC}$ | 839 | 839 | 839 |
| $N_{CS}$ | 26 | 13 | 13 |
| u | 80, 759 | 80 | 797 |

FIG.16

NETWORK MANAGEMENT DEVICE, BASE STATION DEVICE AND NETWORK MANAGEMENT METHOD

TECHNICAL FIELD

The present invention relates to a network management apparatus, a base station apparatus, and a network management method, and more particularly, relates to a network management apparatus, a base station apparatus and a network management method that mitigate inter-cell interference between preambles.

BACKGROUND ART

Long Term Evolution (LTE), which is a mobile communication standard, provides features that improve spectrum efficiency and reduce latency as compared to conventional communication standards. LTE is thus expected to be a promising standard that will support evolution of future mobile communication business.

LTE employs single carrier-frequency division multiplexing access (SC-FDMA) as the uplink modulation scheme. In SC-FDMA, the minimum unit for forming an information symbol in the frequency domain is one subcarrier. A set of 12 subcarriers is called one resource block (hereinafter, referred to as "RB"), and frequency resources for each uplink channel are assigned in units of RBs.

Physical uplink control channel (PUCCH) format 2, PUCCH format 1, physical random access channel (PRACH) and physical uplink shared channel (PUSCH) are assigned as uplink channels.

A scheduler in a base station apparatus determines the frequency position, the subframe timing and the number of RBs used for each channel (see, NPL 1, for example).

When observed in the time direction, a transmission of each channel is allocated in a unit called a subframe. Each subframe consists of 14 SC-FDMA symbols for normal cyclic prefix (CP) and consists of 12 SC-FDMA symbols for extended CP. PUSCH and PUCCH are scheduled in units of subframes. PRACH is used to transmit initial connection signals called a preamble, and allocation of a PRACH transmission is dynamically set within a range of one to three subframes in accordance with a cell radius and/or the like of a base station apparatus.

In recent years, development of small base station apparatuses called pico cells or Home eNBs (hereinafter, abbreviated as "HeNB") has been carried out for the purpose of covering dead zones for mobile phones.

HeNBs are supposedly installed indoors in most cases and are said to have a capacity of several terminals in general and several tens of terminals at most. Moreover, a cell formed by a HeNB is smaller than a cell formed by a conventional macro base station apparatus (hereinafter, referred to as "MeNB"). In addition, all communication terminal apparatuses served by a HeNB or a MeNB communicate with the corresponding HeNB or MeNB, using the SC-FDMA scheme having the frame structure described above.

Conventional MeNBs are installed in accordance with a base station design appropriately developed by a communication carrier in advance. Thus, inter-cell interference would not be a significant problem with MeNBs. Meanwhile, HeNBs can be installed anywhere by end users, so that interference with a MeNB will be a significant problem. In particular, interference to a preamble in uplink random access causes a significant problem in an initial connection attempt made by a mobile station served by a HeNB (hereinafter, such a mobile station is referred to as "HUE").

The 3rd Generation Partnership Project (3GPP), which is a standardization body for mobile communication standards, has proposed various techniques as typified by a technique described in NPL 2. NPL 2 discloses a technique that reserves part of resources of a MeNB for a preamble for a HeNB, thereby preventing preambles transmitted from communication terminal apparatuses served by the respective base station apparatuses from interfering with each other.

CITATION LIST

Non-Patent Literature

NPL 1
3GPP TS 36.211 V8.9.0, "Physical Channels and Modulation"
NPL 2
R1-103574 "Inter-cell Interference Mitigation between PRACH and PUCCH/PUSCH in Heterogeneous Networks" (MediaTek Inc.)

SUMMARY OF INVENTION

Technical Problem

The technique disclosed in NPL 2, however, reserves part of resources used for a MeNB for the number of HeNBs that may interfere with the MeNB. To put it differently, the technique disclosed in NPL 2 involves a problem that the amount of resources used for the MeNB may become insufficient when the number of HeNBs increases.

An object of the present invention is to provide a network management apparatus, a base station apparatus and a network management method that are capable of mitigating inter-cell interference between preambles while securing predetermined resources.

Solution To Problem

A network management apparatus according to an aspect of the present invention manages a plurality of base station apparatuses each communicating with a communication terminal apparatus, using a SC-FDMA scheme, the network management apparatus including: a parameter determination section configured to determines a parameter for an uplink preamble for at least one of the plurality of base station apparatuses; and a parameter notification section configured to notifies the base station apparatus for which the parameter is determined, of the determined parameter, in which the parameter determination section determines the parameter in such a way that a transmission sequence of the preamble does not overlap a transmission sequence of another preamble between at least two of the plurality of base station apparatuses.

A base station apparatus according to an aspect of the present invention that performs communications in accordance with the parameter notified by the network management apparatus according to claim 1, the base station apparatus including: a receiving section configured to receives radio signals; and a preamble detection section configured to detects the preamble by peak search with respect to the received radio signals, in which the preamble detection section performs the peak search within a range smaller than a range of peak search performed by another base station apparatus.

A network management method according to an aspect of the present invention is a method of managing a plurality of base station apparatuses each communicating with a communication terminal apparatus, using a SC-FDMA scheme, the method including: determining a parameter for an uplink preamble for at least one of the plurality of base station apparatuses; and notifying the base station apparatus for which the parameter is determined, of the parameter, in which in the determining the parameter, the parameter is determined in such a way that a transmission sequence of the preamble does not overlap a transmission sequence of another preamble between at least two of the plurality of base station apparatuses.

Advantageous Effects of Invention

According to the present invention, inter-cell interference between preambles can be mitigated while predetermined resources are secured.

BRIEF DESCRIPTION OF DRAWINGS

FIG. 5 is a diagram representing examples of PRACH parameters in Embodiment 1 of the present invention;

FIG. 6 is a diagram representing examples of secondary parameters in Embodiment 1 of the present invention;

FIG. 15 is a diagram representing examples of PRACH parameter values in Embodiment 2 of the present invention;

FIG. 16 is a diagram representing examples of secondary parameters in Embodiment 2 of the present invention;

DESCRIPTION OF EMBODIMENTS

Hereinafter, embodiments of the present invention will be described in detail with reference to the drawings.

Embodiment 1

Figure 1:
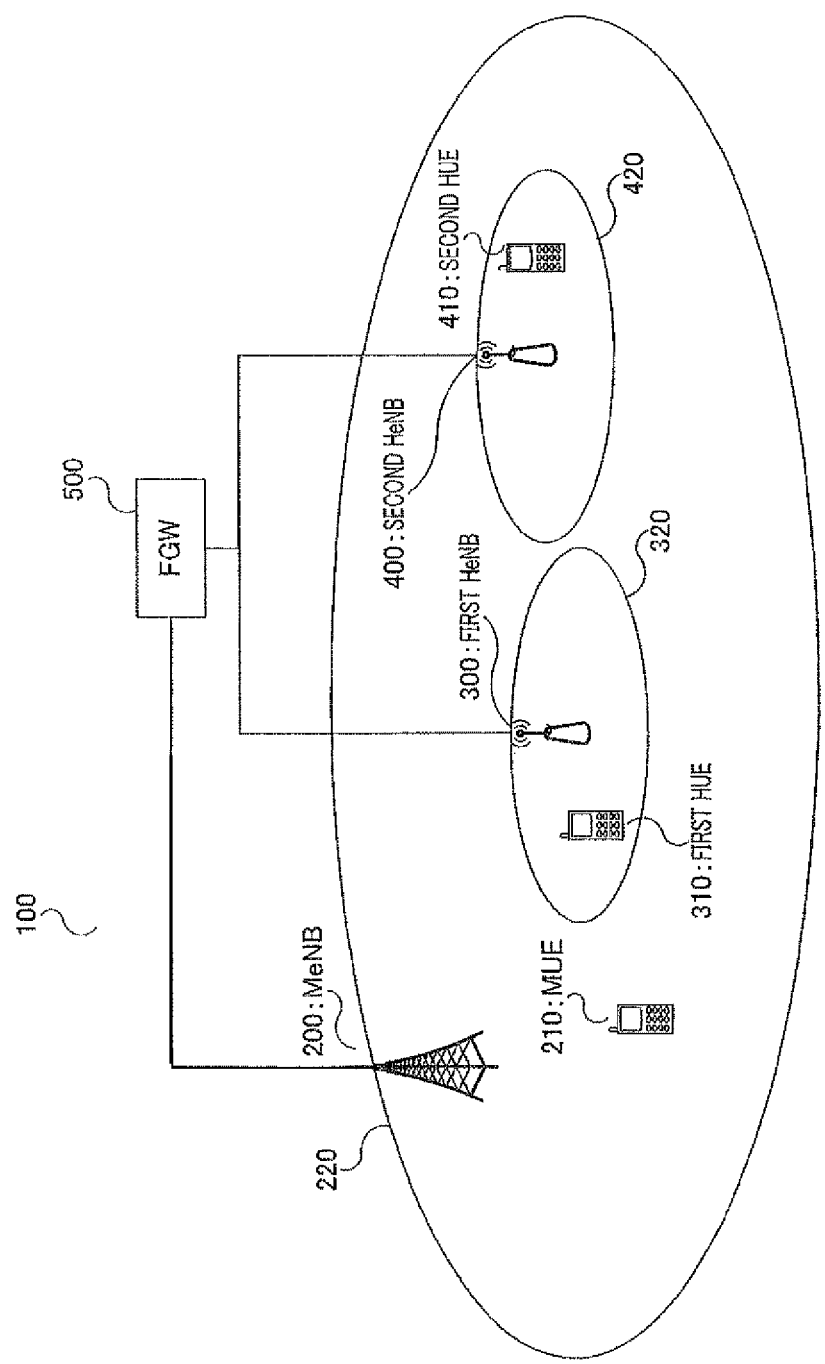
FIG. 1 is a system configuration diagram illustrating a configuration of a network system including a network management apparatus according to Embodiment 1 of the present invention.

FIG. 1 is a system configuration diagram illustrating a configuration of a network system including a network management apparatus according to Embodiment 1 of the present invention.

As illustrated in FIG. 1, network system 100 mainly includes MeNB 200, MUE 210, first HeNB 300, first HUE 310, second HeNB 400 and second. HUE 410. MUE 210 is a MUE served by MeNB 200. First HUE 310 is a HUE served by first HeNB 300. Second HUE 410 is a HUE served by second HeNB 400. All of these apparatuses are LTE compliant base station apparatuses or communication terminal apparatuses.

In addition, network system 100 includes femto gateway apparatus 500 configured to connect MeNB 200, first HeNB 300 and second HeNB 400 together. Femto gateway apparatus (hereinafter, referred to as "FGW") 500 corresponds to the network management apparatus according to the present invention.

First cell 320 of first HeNB 300 and second cell 420 of second HeNB 400 are both within cell 220 of MeNB 200. Accordingly, a preamble transmitted from MUE 210 and preambles transmitted from first HUE 310 and second HUE 410 may interfere with each other.

Thus, FGW 500 determines parameters for the preambles of first HUE 310 and second HUE 410 so as to mitigate the interference. To put it more specifically, FGW 500 determines the parameters in such a way that transmission sequences of uplink preambles do not overlap each other between MeNB 200 and first HUE 310, and second HUE 410. In other words, FGW 500 determines the abovementioned parameters in such a way that no overlap occurs between MeNB 200 and first HUE 310 and between MeNB 200 and second HUE 410. In this manner, network system 100 mitigates inter-cell interference between uplink preambles while securing predetermined resources.

Figure 2:
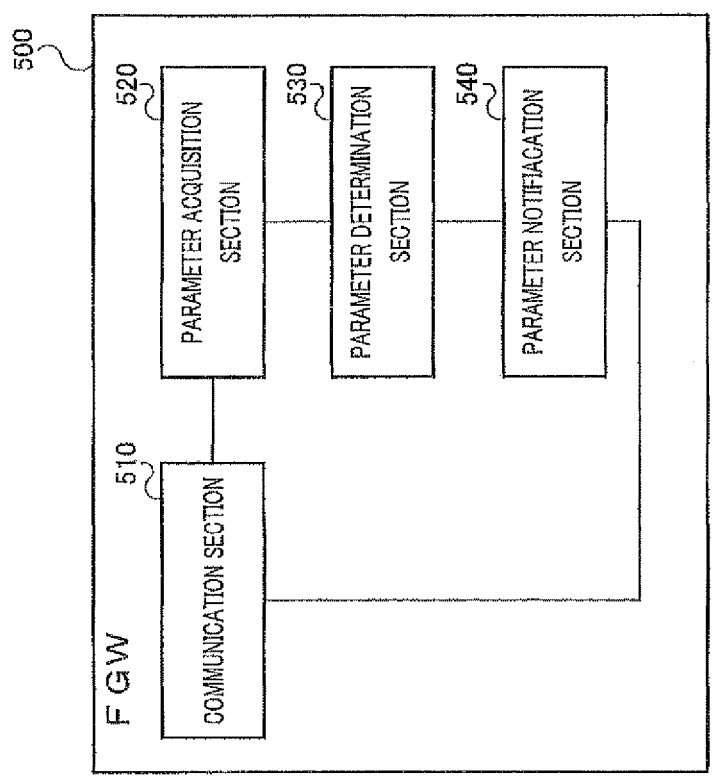
FIG. 2 is a block diagram illustrating a configuration of a FGW serving as the network management apparatus according to Embodiment 1 of the present invention.

FIG. 2 is a block diagram illustrating a configuration of FGW 500.

As illustrated in FIG. 2, FGW 500 mainly includes communication section 510, parameter acquisition section 520, parameter determination section 530 and parameter notification section 540.

Communication section 510 is connected to MeNB 200, first HeNB 300 and second HeNB 400 via cables or radio links in a way that allows communication section 510 to communicate with each of the connected apparatuses.

Parameter acquisition section 520 negotiates with MeNB 200 via communication section 510 and acquires parameters for a preamble for MeNB 200 from MeNB 200. In addition, parameter acquisition section 520 outputs the acquired parameters to parameter determination section 530. Details of the parameters will be described hereinafter. The parameters for the preamble for MeNB 200 are to be set by default and are referred to as "PRACH parameters m" as deemed appropriate.

Parameter determination section 530 determines parameters for each of the preambles for first HeNB 300 and second HeNB 400 on the basis of the received parameters from MeNB 200. Hereinafter, the parameters to be determined for first HeNB 300 are referred to as "PRACH parameters h1" as deemed appropriate. In addition, the parameters to be determined for second HeNB 400 are referred to as "PRACH parameters h2" as deemed appropriate.

Parameter determination section 530 determines PRACH parameters h1 and PRACH parameters h2 in such a way that the transmission sequences of the preambles do not overlap each other between MeNB 200 and first HeNB 300 and second HeNB 400. Moreover, parameter determination section 530 outputs the determined PRACH parameters h1 and PRACH parameters h2 to parameter notification section 540.

Parameter notification section 540 notifies first HeNB 300 of the received PRACH parameters h1 via communication section 510. In addition, parameter notification section 540 notifies second HeNB 400 of the received PRACH parameters h2 via communication section 510.

FGW 500 includes a central processing unit (CPU) and a storage medium such as a random access memory (RAM), for example, although they are not illustrated in the drawing. In this configuration, the abovementioned functional sections are implemented through execution of a control program by the CPU.

FGW 500 including the abovementioned configuration can prevent the transmission sequences of preambles from overlapping each other between MeNB 200, and first HUE 310 and second HUE 410. Accordingly, network system 100 can mitigate inter-cell interference between preambles while securing predetermined resources.

Next, a description will be provided regarding a frame format of subframe T in network system 100 (hereinafter, referred to as "LTE uplink frame format").

Figure 3:
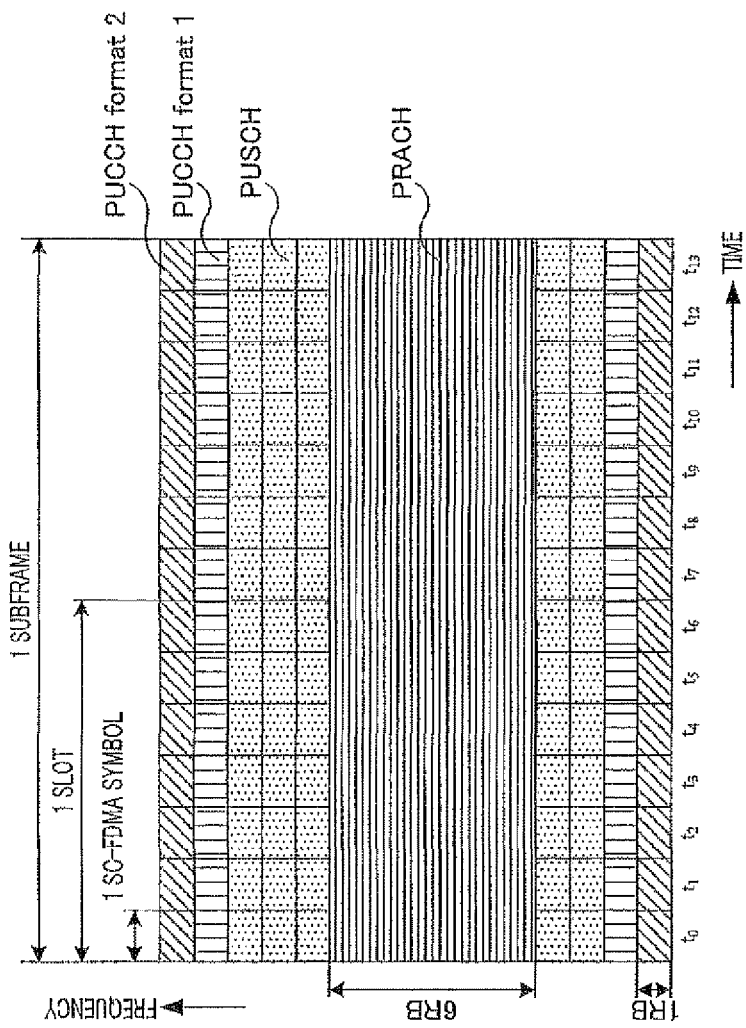
FIG. 3 is a diagram schematically illustrating an LTE uplink frame format in Embodiment 1 of the present invention.

FIG. 3 is a diagram schematically illustrating an LTE uplink frame format.

In FIG. 3, the horizontal axis represents time, and the vertical axis represents frequency. The vertically hatched regions indicate PUCCH format 1 while the obliquely hatched regions indicate PUCCH format 2. The horizontally hatched region indicates PRACH. The dotted regions indicate PUSCH.

PUCCH format 1 is a region for superimposing downlink ACK/NACK information and consists of one RB. PUCCH format 2 is a region for superimposing a channel quality indicator (CQI) and consists of one RB. PRACH is a region used for transmitting initial connection signals from a mobile station apparatus and consists of a total of six RBs. PUSCH is a region for superimposing data signals.

PUCCH format 2 is located at both edge portions of the uplink channel bandwidth, and PUCCH format 1 is located at inner portions adjacent to the edge portions of the uplink channel bandwidth. The PUCCHs can be code-multiplexed or frequency-multiplexed in the same cell. PRACH is located at a frequency position and subframe timing that are previously determined by a base station apparatus. PUSCH is located at the remaining portions of the bandwidth. A scheduler in a base station apparatus determines the number of RBs to be used for each communication terminal apparatus.

To put it more specifically, the subframe timing (i.e., transmission timing), transmission sequence and frequency position (i.e., frequency assignment) of the PRACH used by each communication terminal apparatus are optionally determined within a predetermined range by the base station apparatus serving the communication terminal apparatus. MeNB 200, first HeNB 300 and second HeNB 400 control communications performed by MUE 210, first RUE 310 and second HUE 410 served by MeNB 200, first HeNB 300 and second HeNB 400, respectively, in accordance with the abovementioned parameters notified by FGW 500.

Next, a description will be provided regarding an operation of FGW 500.

Figure 4:
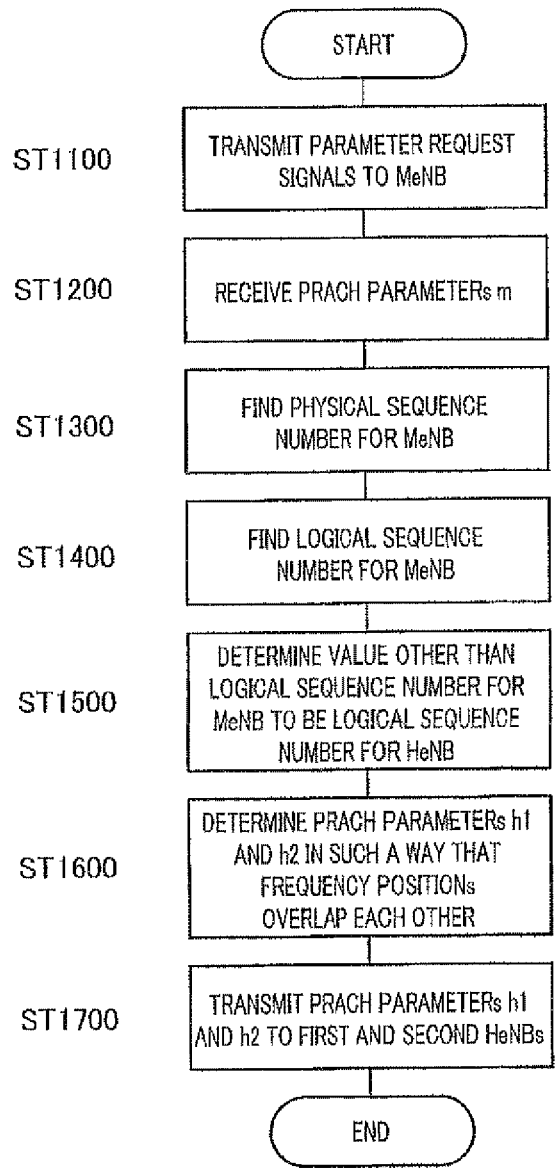
FIG. 4 is a flowchart illustrating an exemplary operation of the FGW according to Embodiment 1 of the present invention.

FIG. 4 is a flowchart illustrating an exemplary operation of FGW 500. FGW 500 performs the processing operation illustrated in FIG. 4, every time the network configuration changes due to a reason such as addition of a radio base station, for example.

In step ST 1100, parameter acquisition section 520 transmits parameter request signals to MeNB 200. The parameter request signals are signals for requesting a reply with the following parameters as PRACH parameters m.

(1) PRACH configuration index: information indicating the format type and transmission timing of a PRACH preamble (hereinafter, simply referred to as "preamble"). The information is referred to as "transmission timing value," hereinafter.

(2) Logical root sequence number: information indicating the transmission sequence of a preamble. The information is referred to as "logical sequence number," hereinafter.

(3) $N_{CS}$ configuration: information indicating the number of cyclic shifts. The information is referred to as "$N_{CS}$ configuration value," hereinafter.

(4) High speed flag: information indicating whether or not the cell supports a high-speed moving environment.

(5) Frequency position: information indicating the frequency position of a preamble. The information is referred to as "frequency starting number," hereinafter.

In step ST 1200, parameter acquisition section 520 receives PRACH parameters m as a reply from MeNB 200 and outputs the received PRACH parameters m to parameter determination section 530.

FIG. 5 is a diagram representing examples of values of PRACH parameters m transmitted as a reply from MeNB 200, and examples of values of PRACH parameters h1 and h2 to be determined on the basis of these values. PRACH parameters h1 and h2 will be described, hereinafter.

As represented in FIG. 5, PRACH parameters m include a transmission timing value, a logical sequence number, a $N_{CS}$ configuration value, a high speed flag and a frequency starting number. When the transmission timing value=0, this means that the transmission timing of the preamble is where the frame number is odd and the subframe number is equal to 1 (referred to as "subframe T," hereinafter). When the high speed flag=0, this means that the cell does not support a high-speed moving environment. When the frequency starting number=3, this means that the frequency bandwidth consists of a total of six RBs starting from the frequency position number 3 (i.e., RB numbers 3 to 8) is used for transmission of the preamble.

In step ST 1300 of FIG. 4, parameter determination section 530 calculates a physical root sequence number of MeNB 200 on the basis of the received PRACH parameters m. A physical root sequence number has a correlation with the logical sequence number and the $N_{CS}$ configuration value and is a value that defines the transmission sequence of the preamble. The physical root sequence number is referred to as "physical sequence number," hereinafter.

To put it more specifically, parameter determination section 530 calculates a physical sequence number used by MeNB 200 in the following manner.

First, parameter determination section 530 finds secondary parameters using a conversion table (e.g., conversion table described in NPL 1) previously stored in parameter determination section 530, on the basis of the transmission timing, the $N_{CS}$ configuration value and high speed flag of PRACH parameters m. The secondary parameters are $N_{ZC}$, $N_{CS}$ and physical sequence number u.

Parameter determination section 530 finds the number of physical sequence numbers $M_m$ used by MeNB 200, using equation 1 below, on the basis of the found $N_{ZC}$ and $N_{CS}$.

(Equation 1)

$$M_m = \lceil 64 / \lfloor N_{ZC} / N_{CS} \rfloor \rceil \quad [1]$$

FIG. 6 is a diagram representing examples of secondary parameter values to be found on the basis of PRACH parameters m. This drawing also represents examples of secondary parameter values for PRACH parameters h1 and h2, which are to be described hereinafter, and which are determined on the basis of the secondary parameter values generated using PRACH parameters m.

Upon reception of PRACH parameters m represented as examples in FIG. 5, for example, since the transmission timing value=0 and $N_{CS}$ configuration value=5, the following values can be found as represented in FIG. 6: $N_{ZC}$=839 and $N_{CS}$=26. It is found that $M_m$=2 on the basis of these values and equation 1. In addition, physical sequence number u used by MeNB is found as: u=80, 759 on the basis of the values: $M_m$=2 and logical sequence number=30.

In step ST 1400 of FIG. 4, parameter determination section 530 finds a logical sequence number used by MeNB 200 on the basis of the found physical sequence number.

To put it more specifically, parameter determination section 530 determines the range of the number of physical sequence numbers $M_m$ that starts from the logical sequence number of PRACH parameters m to be the logical sequence number used by MeNB 200.

For example, upon receipt of PRACH parameters m represented in the examples of FIG. 5, the number of physical sequence numbers $M_m$ becomes "2," and the logical sequence number of PRACH parameters m is "30." Accordingly, the logical sequence numbers to be used by MeNB 200 become "30, 31" on the basis of these values.

In step ST 1500, parameter determination section 530 determines any value other than the logical sequence numbers used by MeNB 200 to be the logical sequence numbers used by first HeNB 300 and second HeNB 400, respectively.

For example, upon receipt of PRACH parameters m represented in the example of FIG. 5, the logical sequence numbers used by MeNB 200 become "30, 31" as described above, so that parameter determination section 530 determines "32, 33," for example, to be the logical sequence numbers used by first HeNB 300 and second HeNB 400, respectively.

In this case, physical sequence numbers u of first HeNB 300 and second HeNB 400 become "42" and "797," respectively, on the basis of the abovementioned conversion table, as represented in FIG. 6.

In step ST 1600, parameter determination section 530 determines the remaining values for PRACH parameters h1 and h2 in such a way that the frequency positions of the PRACHs overlap each other between MeNB 200, first HeNB 300 and second HeNB 400. Parameter determination section 530 outputs the determined PRACH parameters h1 and h2 to parameter notification section 540.

To put it more specifically, in this embodiment, parameter determination section 530 determines values common to PRACH parameters h1 and h2 for the transmission timing values, logical sequence numbers, $N_{CS}$ configuration values, high speed flags and frequency starting numbers.

As represented in FIG. 5, for example, the same values as those of PRACH parameters m are set for all the transmission timing values, high speed flags and frequency starting numbers of PRACH parameters h1 and h2.

As represented in FIG. 5, for example, parameter determination section 530 sets the $N_{CS}$ configuration values of PRACH parameters h1 and h2 to be "1," which is the smallest possible value other than "0." This is because a larger $N_{CS}$ configuration value not only increases the range of the cell coverage, but also increases consumption of radio resources. Meanwhile, the cell radii of HeNBs are very small, so that the need for increasing the coverage areas is low. The values of $N_{CS}$ in this case for both first HeNB 300 and second HeNB 400 become "13" according to the abovementioned conversion table, as represented in FIG. 6.

In step ST 1700 of FIG. 4, parameter notification section 540 transmits the received PRACH parameters h1 to first HeNB 300. In addition, parameter notification section 540 transmits the received PRACH parameters h2 to second HeNB 400.

FGW 500 can prevent the transmission sequences of preambles from overlapping each other between MeNB 200, and first HUE 310 and HUE 410 by the operation described above.

Next, a description will be provided regarding an operation of entire network system 100.

Figure 7:
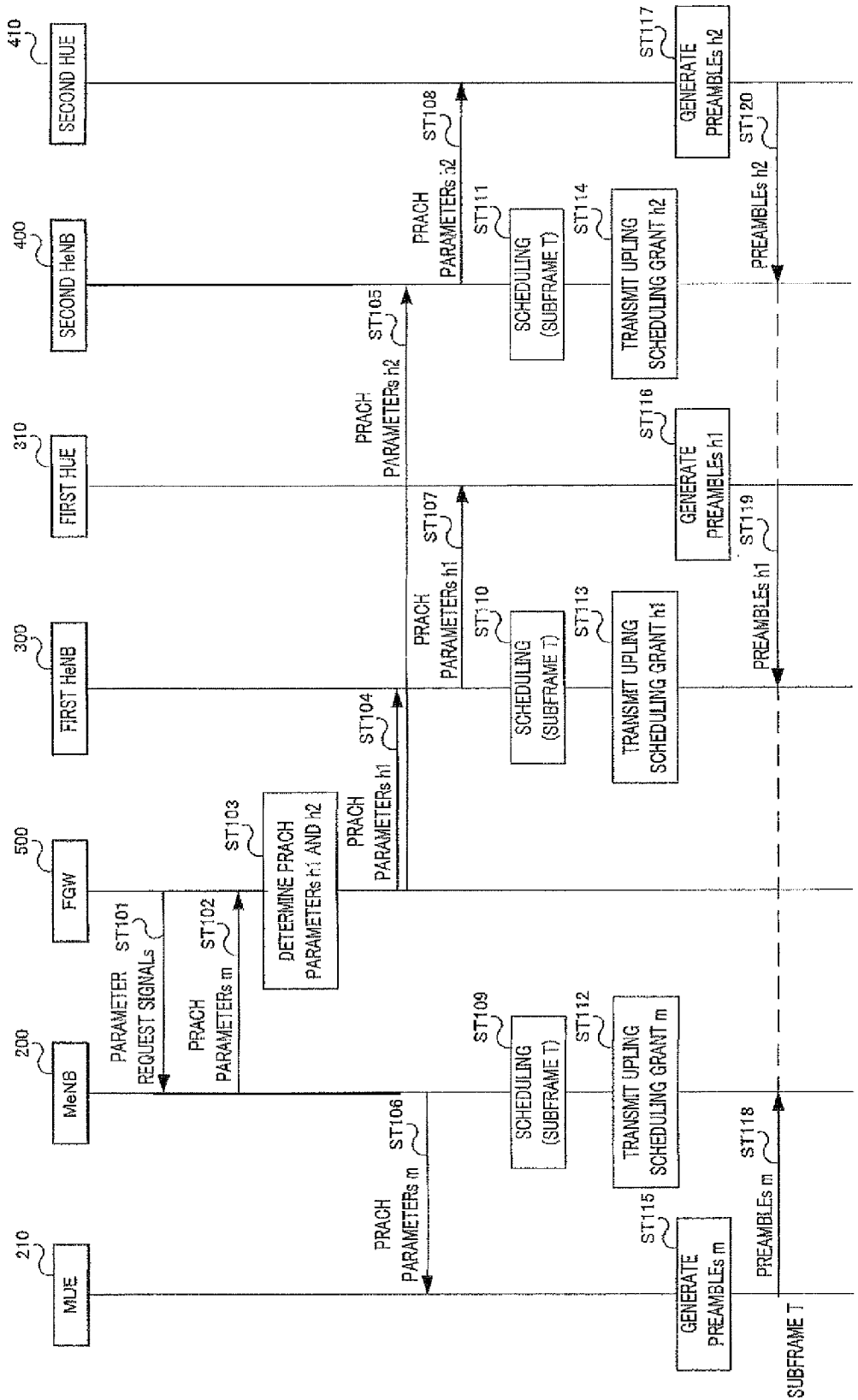
FIG. 7 is a sequence diagram illustrating an exemplary operation of the entire network system in Embodiment 1 of the present invention.

FIG. 7 is a sequence diagram illustrating an exemplary operation of entire network system 100.

FGW 500 first transmits parameter request signals to MeNB 200 (ST 101) and receives PRACH parameters m as a response to the request (ST 102). Subsequently, FGW 500 determines PRACH parameters h1 and h2 in such a way that no overlap occurs with the transmission sequence of MeNB 200 (ST 103) and transmits determined PRACH parameters h1 to first HeNB 300 and PRACH parameters h2 to second HeNB 400 (ST 104, ST 105). It should be noted that, FGW 500 does not have to transmit the abovementioned secondary parameters ($N_{ZC}$, $N_{CS}$, u) during these transmissions.

MeNB 200 transmits PRACH parameters m to MUE 210 on a broadcast channel (ST 106). Likewise, first HeNB 300 transmit PRACH parameters h1 to first HUE 310 and second HeNB 400 transmits PRACH parameters h2 to second HUE 410 on a broadcast channel (ST 107, ST 108).

MeNB 200, first HeNB 300 and second. HeNB 400 perform scheduling for communication terminal apparatuses other than MUE 210, first HUE 310 and second HUE 410 that are present in their respective cells (not illustrated, but referred to as MUE x, HUE 1x, HUE 2x) (ST 109, ST 110, ST 111). The scheduling to be performed herein is a process of assigning a channel other than PRACH, such as PUSCH to subframe T. In this process, MeNB 200, first HeNB 300 and second HeNB 400 each allocate an RB number to the channel other than PRACH in such a way that the RB number does not overlap with RB numbers 3 to 8, which are allocated to PRACH.

MeNB 200 transmits the generated scheduling information to MUE x as uplink scheduling grant (UL grant) m (ST 112). First HeNB 300 transmits the generated scheduling information to HUE 1x as uplink scheduling grant h1 (ST 113). Second HeNB 400 transmits the generated scheduling information to HUE 2x as uplink scheduling grant h2 (ST 114).

Meanwhile, MUE 210, first HUE 310 and second HUE 410 generate sets of preamble sequence candidates on the basis of the received PRACH parameters m, h1 and h2. MUE 210, first HUE 310 and second HUE 410 select preamble sequences to be transmitted to subframe T, from among the generated sets of preamble sequence candidates, respectively (ST 115, ST 116, ST 117).

A description will be provided regarding the details of selection of the preamble sequence, using a frequency division duplex (FDD) mode as an example.

Each communication terminal apparatus performs cyclic shifts of a Zadoff-Chu (ZC) sequence. The ZC sequence is expressed by equation 2 below and is the root of a preamble sequence. The cyclic shifts expressed by equation 3 below are performed on the ZC sequence. Accordingly, each communication terminal apparatus obtains a signal sequence (i.e., preamble sequence) to be transmitted on PRACH. It should be noted that, $N_{ZC}$ is a sequence length and is a value uniquely obtainable by the transmission timing value in this case. In addition, u is called a physical sequence number, and one or more values are selected from a logical sequence number and $N_{CS}$ configuration value for u. Moreover, $C_v$ is a cyclic shift value.

(Equation 2)

$$x_u(n) = e^{-j\frac{\pi un(n+1)}{N_{ZC}}}, \ 0 \le n \le N_{ZC} - 1 \quad [2]$$

(Equation 3)

$$x_{u,v}(n) = x_u((n + C_v) \bmod N_{ZC}) \quad [3]$$

In a case where a cell does not support a high speed moving environment (i.e., when high speed flag=0), cyclic shift value $C_v$ for the cell is expressed by equation 4 below.

(Equation 4)

$$C_v = \begin{cases} vN_{CS} & v=0, 1, \ldots, \lfloor N_{ZC}/N_{CS} \rfloor - 1, N_{CS} \ne 0 \\ 0 & N_{CS} = 0 \end{cases} \quad [4]$$

In this equation, $N_{CS}$ is the unit of cyclic shift and is a value uniquely obtainable from the $N_{CS}$ configuration value and high speed flag. When $N_{CS}$=0, this means that no cyclic shift is performed.

Each communication terminal apparatus determines $N_{ZC}$, $N_{CS}$, and u from four parameters except for the frequency starting number among the PRACH parameters and randomly selects one candidate from the set of candidates for physical sequence number u and transmits a preamble to the corresponding base station apparatus.

Figure 8:
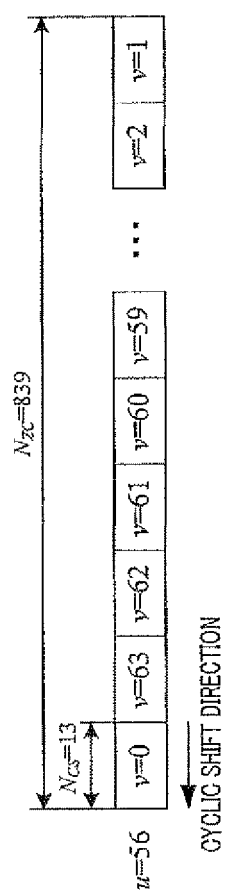
FIG. 8 is a diagram illustrating an exemplary configuration of a preamble sequence in Embodiment 1 of the present invention.
Figure 9:
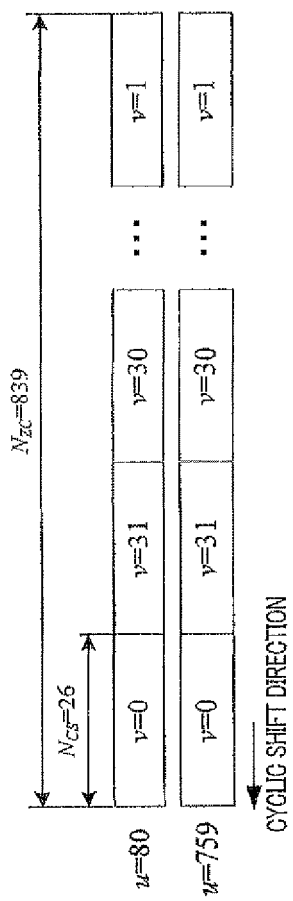
FIG. 9 is a diagram illustrating another exemplary configuration of the preamble sequence in Embodiment 1 of the present invention.
Figure 10:
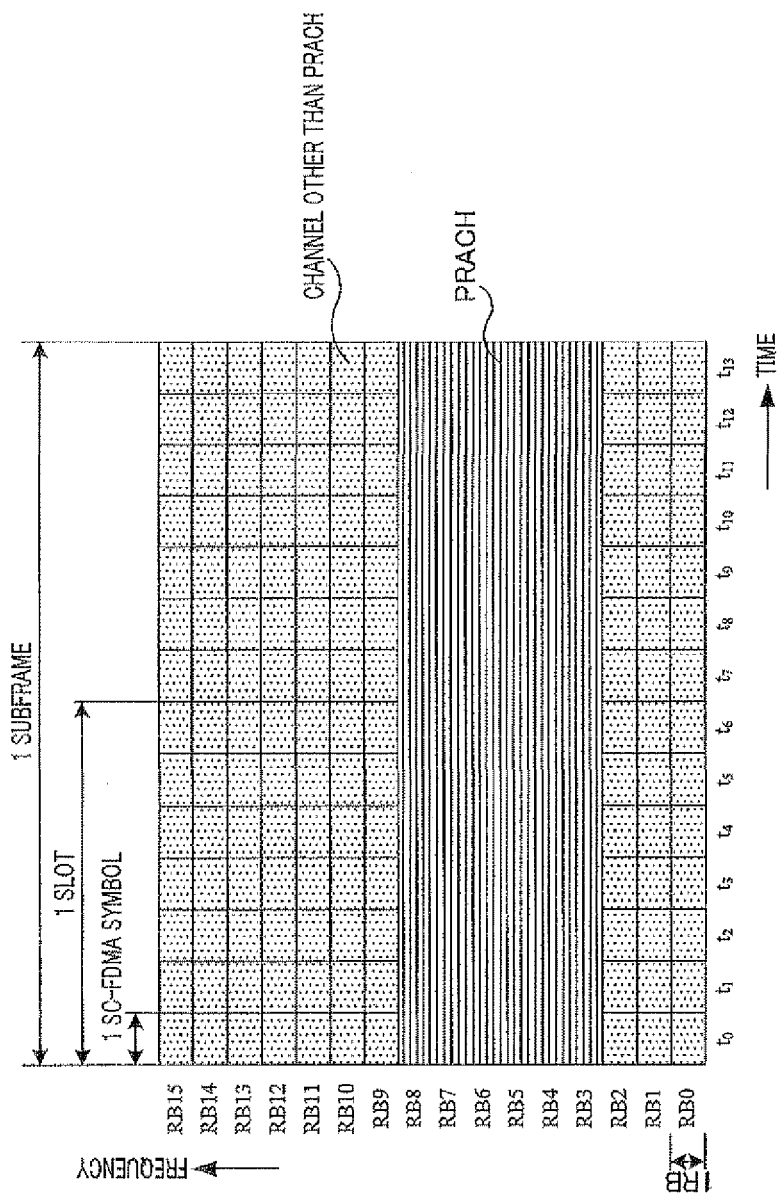
FIG. 10 is a diagram illustrating an exemplary uplink frame format of a MeNB in Embodiment 1 of the present invention.
Figure 11:
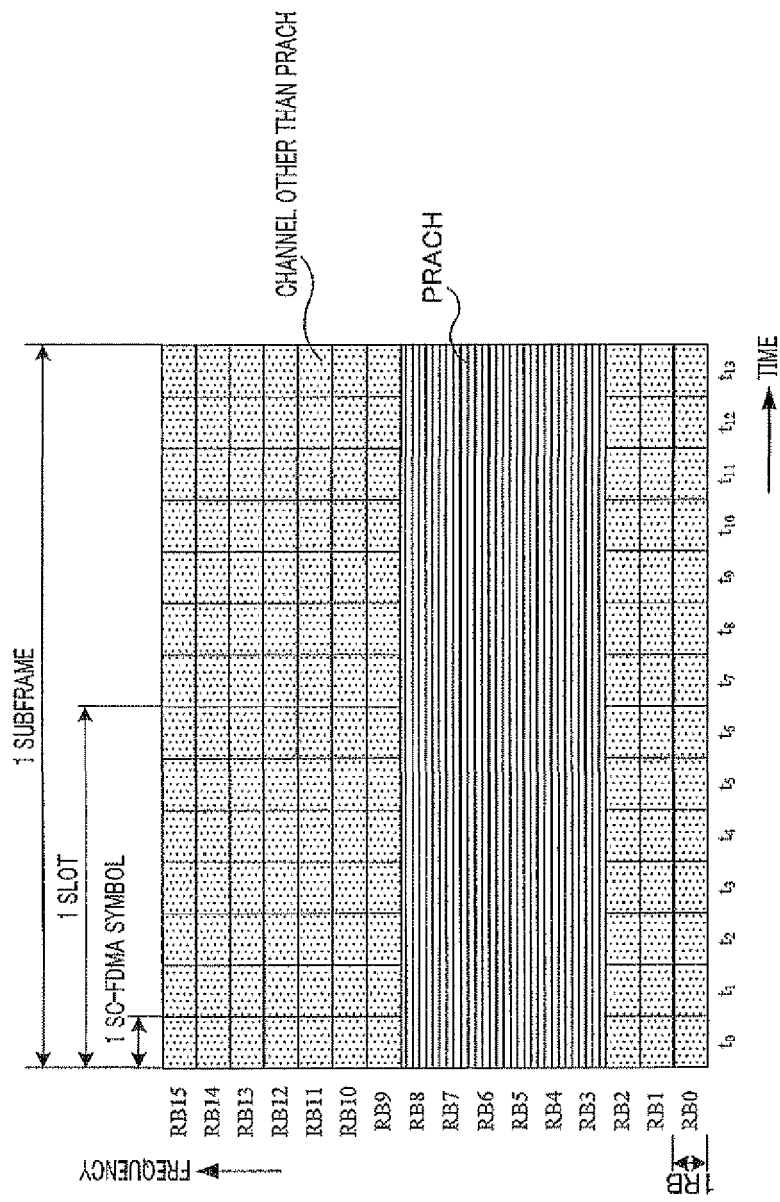
FIG. 11 is a diagram illustrating an exemplary uplink frame format of a first HeNB in Embodiment 1 of the present invention.
Figure 12:
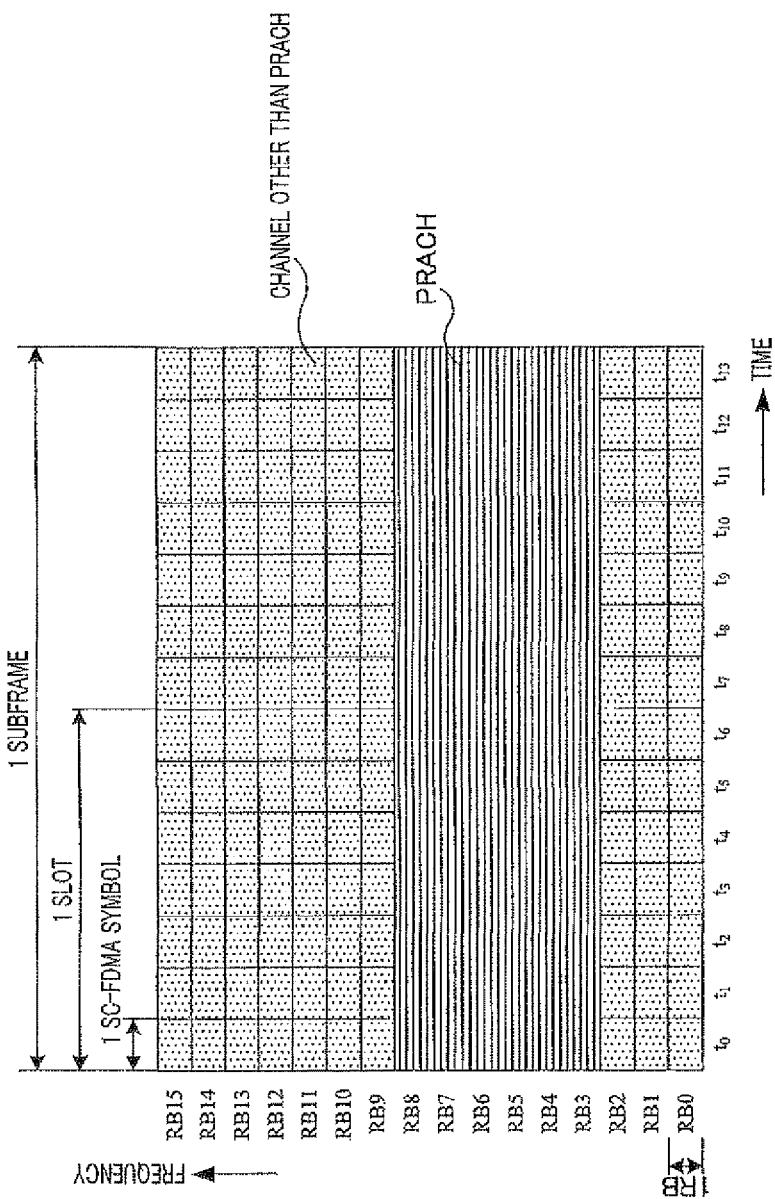
FIG. 12 is a diagram illustrating an exemplary uplink frame format of a second HeNB in Embodiment 1 of the present invention.
Figure 13:
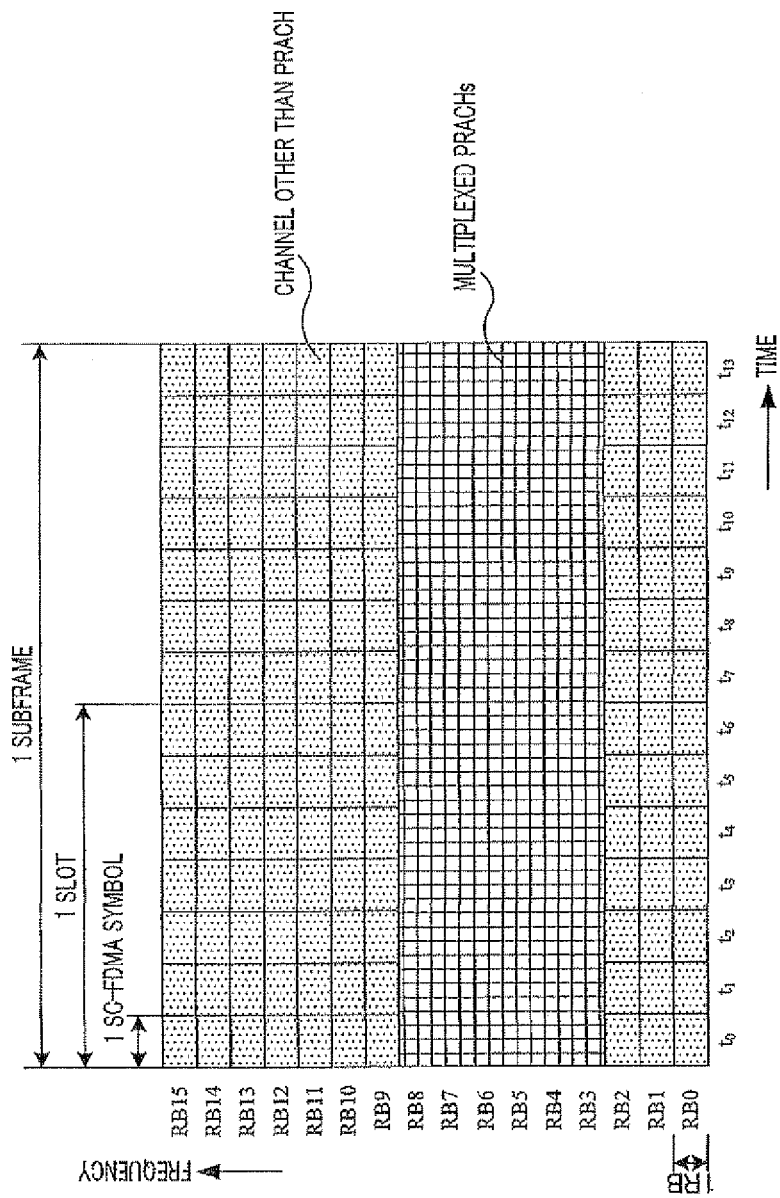
FIG. 13 is a diagram illustrating an exemplary uplink frame format of the entire network system in Embodiment 1 of the present invention.

FIG. 8 is a diagram illustrating, as example 1, a configuration of a preamble sequence when the transmission timing value=0, the logical sequence number=24, the $N_{CS}$ configuration value=1 and the high speed flag=0. In addition, FIG. 9 is a diagram illustrating, as example 2, a configuration of a preamble sequence when the transmission timing value=0, the logical sequence number=30, the $N_{CS}$ configuration value=5 and the high speed flag=0.

In example 1, $N_{ZC}$=839 and $N_{CS}$=13 are selected on the basis of the PRACH parameters. Accordingly, the number of ZC sequences $M_1$ required for generating 64 preamble sequences is expressed by equation 5 below.

$$M_1 = \lceil 64/\lfloor N_{ZC}/N_{CS} \rfloor \rceil = 1 \quad \text{(Equation 5)}$$

In addition, u=56 is selected on the basis of the number of ZC sequences $M_1$ and the logical sequence number. In this case, a ZC sequence generated on the basis of the parameter which is u=56 is cyclically shifted in units of 13 samples in the left direction to generate a set of 64 preamble sequence candidates.

In example 2, $N_{ZC}$=839 and $N_{CS}$=26 are selected on the basis of the PRACH parameters. Accordingly, the number of ZC sequences $M_2$ required for generating 64 preamble sequences is expressed by equation 6 below.

$$M_2 = \lceil 64/\lfloor N_{ZC}/N_{CS} \rfloor \rceil = 2 \quad \text{(Equation 6)}$$

In addition, two parameters (u=80, 759) are selected on the basis of the number of ZC sequences $M_2$ and the logical sequence number. In this case, two ZC sequences are each cyclically shifted in units of 26 samples in the left direction to generate a set of 64 preamble sequence candidates in total.

Each communication terminal apparatus randomly selects one candidate from a set of the generated 64 preamble sequence candidates. The communication terminal apparatus transmits PRACH of the selected preamble sequence, using the time and frequency resources corresponding to the transmission timing value and frequency starting number included in the PRACH parameters notified from the corresponding base station apparatus.

To put it more specifically, MUE 210, first HUE 310 and second HUE 410 transmit the generated preamble sequences M, h1 and h2, respectively (ST 118, ST 119, ST 120 in FIG. 7). Meanwhile, MUE x, HUE 1x and HUE 2x transmit other channels such as PUSCH.

Network system 100 can realize code-multiplexing by applying different ZC sequences to the preambles for MeNB 200, first HeNB 300 and second HeNB 400 by the operation described above. In addition, network system 100 can thereby allocate the preambles for MeNB 200; first HeNB 300 and second HeNB 400 to the region represented by the same time and the same frequency resources.

FIGS. 10 to 13 are diagrams illustrating examples of uplink frame formats of MeNB 200, first HeNB 300, second HeNB 400 and entire network system 100 in this order. In FIGS. 10 to 13, the horizontally hatched regions represent PRACH and the region having a grid hatch pattern represents the multiplexed PRACHs, while the dotted regions represent channels other than PRACH.

As illustrated in FIGS. 10 to 13, the preambles formed in subframe T from MUE 210, first HUE 310 and second HUE 410 are all allocated to RB3 to RB8. However, different physical sequence numbers are applied to these preambles, respectively. Accordingly, interference between these preambles can be mitigated.

To put it differently, a scheduler in MeNB 200 in network system 100 does not have to reserve any part of radio resources used for preambles of MUE 210. Accordingly, network system 100 can effectively utilize radio resources as compared with the technique described in NPL 2.

In general, the number of HeNBs changes from hour to hour due to start or cancellation of subscriber services, for example. Accordingly, the technique described in NPL 2 requires review of resources that should be reserved by MeNB, every time the number of HeNBs changes. As a result, signaling traffic between MeNB and HeNBs increases in the case of the technique described in NPL 2. Embodiment 1 eliminates the need for such review of resources, thus reducing the signaling traffic between MeNB and HeNBs.

As described above, according to Embodiment 1, transmission sequences of preambles are prevented from overlapping each other among a plurality of cells. Thus, inter-cell interference between preambles can be mitigated while predetermined resources are secured.

Embodiment 2

Embodiment 2 of the present invention illustrates a case where overlapping frequency resources are used among a plurality of HUEs and different frequency resources are used between a MUE and a plurality of HUEs. Embodiment 2 is mainly different from Embodiment 1 in the operation of parameter determination section 530. Hereinafter, a description will be provided focusing on the operation of parameter determination section 530.

Figure 14:
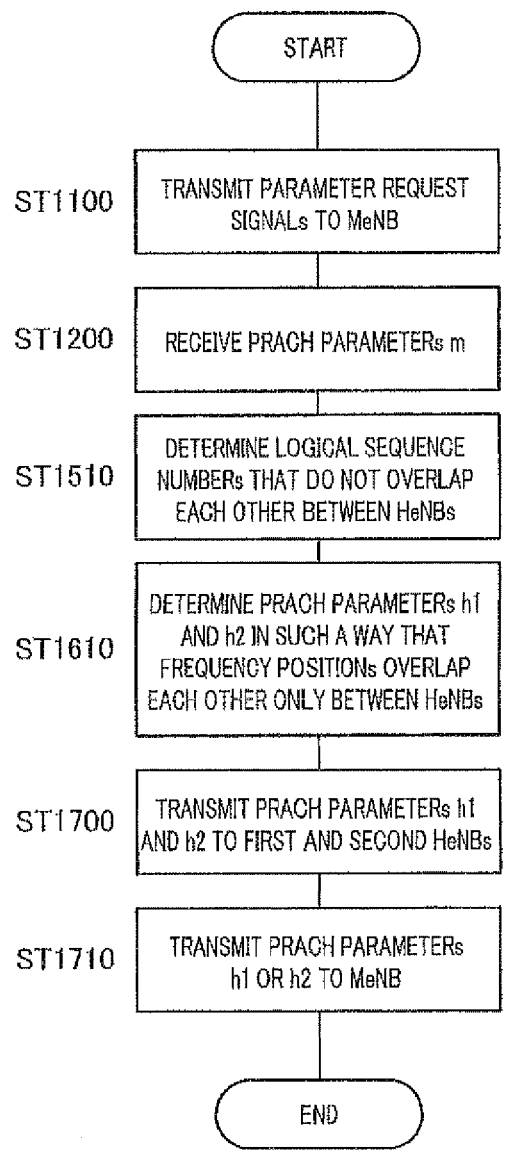
FIG. 14 is a flowchart illustrating an exemplary operation of a network management apparatus according to Embodiment 2 of the present invention.
Figure 17:
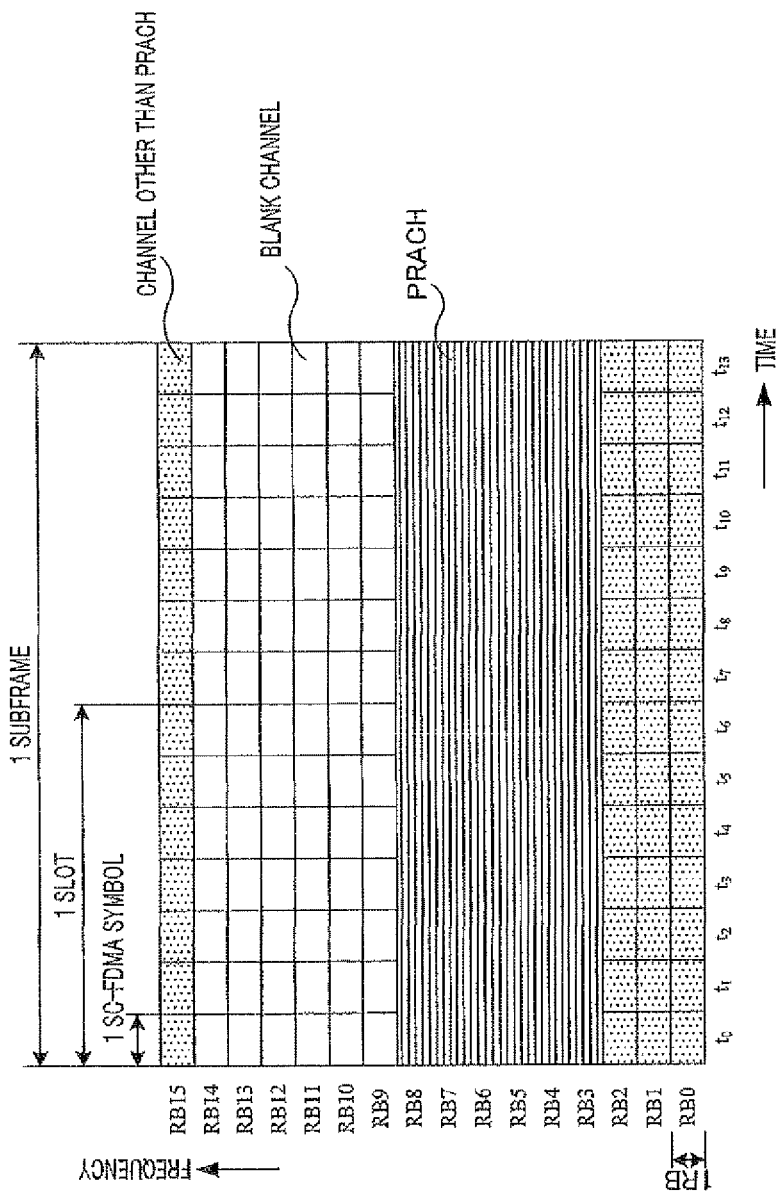
FIG. 17 is a diagram illustrating an exemplary uplink frame format of a MeNB in Embodiment 2 of the present invention.
Figure 18:
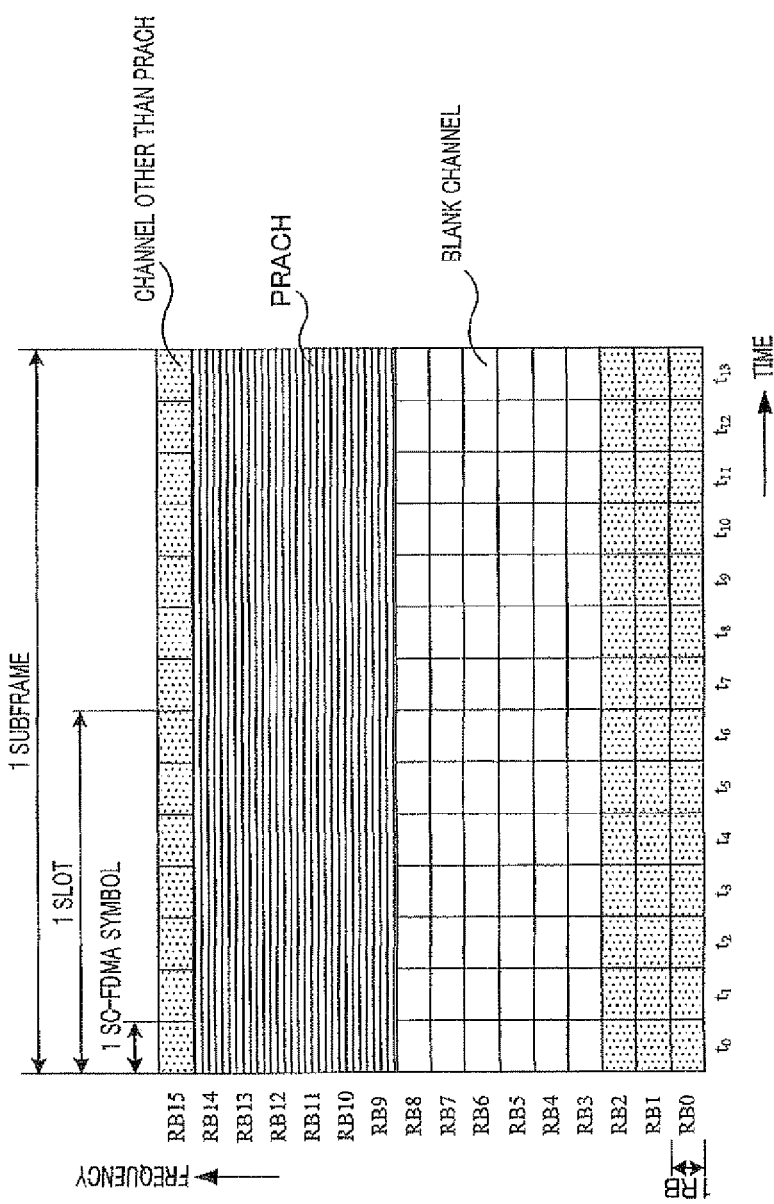
FIG. 18 is a diagram illustrating an exemplary uplink frame format of a first HeNB in Embodiment 2 of the present invention.
Figure 19:
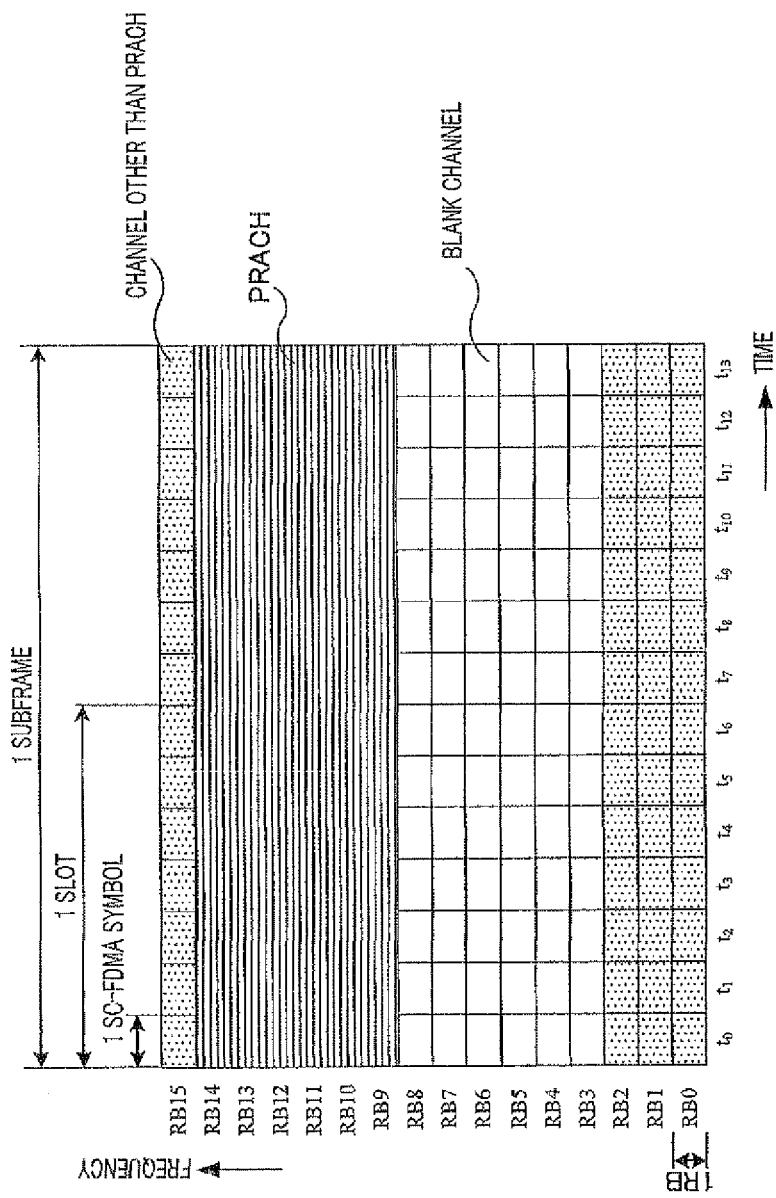
FIG. 19 is a diagram illustrating an exemplary uplink frame format of a second HeNB in Embodiment 2 of the present invention.
Figure 20:
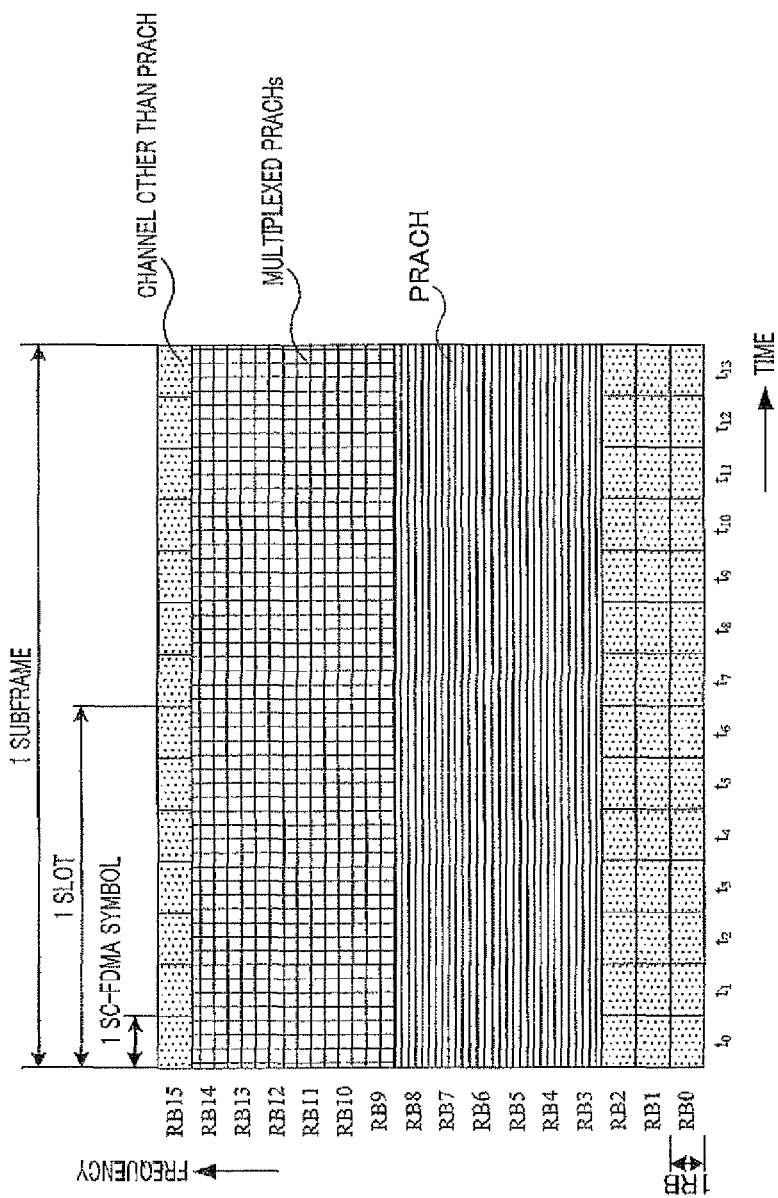
FIG. 20 is a diagram illustrating an exemplary uplink frame format of the entire network system in Embodiment 2 of the present invention.

FIG. 14 is a flowchart illustrating an exemplary operation of a network management apparatus according to Embodiment 2 and corresponding to FIG. 4 of Embodiment 1. The steps identical to those in FIG. 4 are assigned the same step numbers, and the descriptions for these steps are omitted.

Upon receipt of PRACH parameters m received in step ST 1200, parameter determination section 530 proceeds to step ST 1510.

In step ST 1510, parameter determination section 530 determines different logical sequence numbers for first HeNB 300 and second HeNB 400. In other words, parameter determination section 530 sets different values for physical sequence numbers u of first HeNB 300 and second HeNB 400, respectively. It should be noted that, the logical sequence numbers and the physical sequence numbers u of first HeNB 300 and second HeNB 400 may or may not overlap those used for MeNB 200.

FIG. 15 is a diagram representing examples of PRACH parameter values and corresponding to FIG. 5 of Embodiment 1.

Parameter determination section 530 of Embodiment 2 determines the logical sequence number of PRACH parameters h1 to be "30" and determines the logical sequence number of PRACH parameters h2 to be "33," as represented in FIG. 15, for example. In this case, physical sequence numbers u of PRACH parameters h1 and h2 become "80" and "797" according to the abovementioned conversion table, respectively.

In step ST 1610 of FIG. 14, parameter determination section 530 determines PRACH parameters h1 and h2 in such a way that the frequency positions of the PRACHs of first HeNB 300 and second HeNB 400 overlap each other but do not overlap the frequency position of the PRACH of MeNB 200. Parameter determination section 530 outputs the determined PRACH parameters h1 and h2 to parameter notification section 540 and proceeds to step ST 1700.

Parameter determination section 530 of Embodiment 2 determines values common to PRACH parameters h1 and h2 for the transmission timing values, $N_{CS}$ configuration values, high speed flags and frequency starting numbers as represented in FIG. 15, for example. Parameter determination section 530, however, determines the number for the frequency starting numbers of PRACH parameters h1 and h2 in such a way that the frequency positions of PRACH parameters h1 and h2 do not overlap the frequency position of PRACH parameters m.

As described in Embodiment 1, RB numbers 3 to 8 are used when the frequency starting number=3. Thus, as represented in FIG. 15, parameter determination section 530 determines "9" for the frequency starting numbers of PRACH parameters h1 and h2. When the frequency starting number=9, this means that a total of six RBs including RB numbers 9 to 14 are used for transmission of the PRACH.

Parameter notification section 540 notifies first HeNB 300 of PRACH parameters h1, and second HeNB 400 of PRACH parameters h2 (ST 1700). In addition, parameter notification section 540 notifies MeNB 200 of at least one set of PRACH parameters h1 and h2 in step ST 1710.

As a result, as described in FIG. 7 of Embodiment 1, each base station apparatus allocates an RB number to a channel other than a PRACH in such a way that the RB number does not overlap with the RB numbers allocated to the PRACH (i.e., an RB number other than RB numbers 3 to 14 in the example in FIG. 15).

MeNB 200 according to Embodiment 2 is configured not to use, in transmission of a preamble, any RBs used for transmission of preambles by first HeNB 300 and second HeNB 400. These RBs are identified on the basis of PRACH parameters h1 or h2 notified by FGW 500.

FIGS. 17 to 20 are diagrams illustrating examples of uplink frame formats of MeNB 200, first HeNB 300, second HeNB 400 and entire network system 100 in this order and corresponding to FIGS. 10 to 13, respectively. In FIGS. 17 to 20, plain regions represent unused channels (i.e., blank channels).

As illustrated in FIGS. 17 to 20, the preamble from MUE 210 is allocated to RB 3 to RB 8, and the preambles from first HUE 310 and second HUE 410 are allocated to RB 9 to RB 14. However, different physical sequence numbers are applied to the preambles from first HUE 310 and second HUE 410, respectively. Accordingly, interference between these preambles can be mitigated.

The transmission power for a preamble increases in proportion to a pathloss between a base station apparatus and a communication terminal apparatus. In general, MeNBs have a large cell radius, so that they involve a large pathloss. Accordingly, the transmission power of preambles for MeNBs tends to be high as a result. On the other hand, HeNBs have a small cell radius, so that the transmission power of preambles for HeNBs tends to be low as a result.

Accordingly, a difference between the transmission power of preambles for MUEs and the transmission power of preambles for HUEs is normally large. Meanwhile, a large difference in the power of preambles leads to loss of orthogonality, thus causing erroneous detection of preambles. In particular, such a situation makes HeNBs more likely to erroneously detect preambles transmitted from MUEs.

According to Embodiment 2, erroneous detection of preambles in HeNBs can be reduced as compared with Embodiment 1 since the frequency positions of preambles do not overlap each other between MUEs and HUEs as described above. Embodiment 2, however, involves the presence of non-transmission resources (i.e., blank resources) in each base station apparatus. Thus, Embodiment 1 is more advantageous than Embodiment 2 in terms of effective use of resources.

It should be noted that, FGW is configured to acquire PRACH parameters m from a MeNB in Embodiments 1 and 2 described above, but may be configured to acquire PRACH parameters from an apparatus other than a MeNB. In addition, the parameters to be acquired are not limited to PRACH parameters. FGW may acquire parameters for another channel in a MeNB or cell ID information on the MeNB, for example, and thereby determine each parameter for HeNBs in the same manner described above. In addition, the number of MeNBs and the number of HeNBs to be managed by a FGW is not limited to the abovementioned example.

Embodiment 3

Embodiment 3 of the present invention illustrates a case where a range of peak search for a preamble by a HeNB is set smaller than a range of peak search for a preamble by a MeNB.

Figure 21:
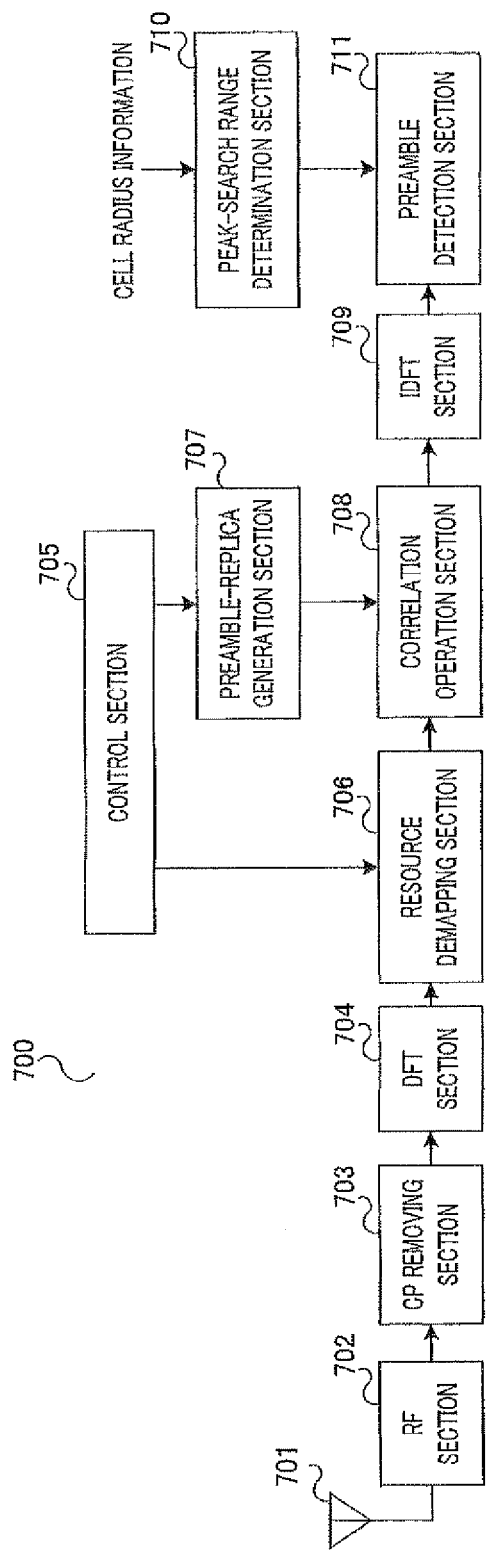
FIG. 21 is a block diagram illustrating an exemplary configuration of a HeNB serving as a base station apparatus according to Embodiment of the present invention.

FIG. 21 is a block diagram illustrating an exemplary configuration of a HeNB serving as a base station apparatus according to Embodiment 3. The HeNB according to Embodiment 3 corresponds to HeNB 300 and HeNB 400 of Embodiments 1 and 2, for example.

As illustrated in FIG. 21, HeNB 700 mainly includes antenna 701, RF section 702, cyclic prefix (CP) removing section 703, discrete Fourier transform (DFT) section 704, control section 705, resource demapping section 706, preamble-replica generation section 707, correlation operation section 708, inverse discrete Fourier transform (IDFT) section 709, peak-search range determination section 710 and preamble detection section 711. The components illustrated between antenna 701 and correlation operation section 708 inclusive and control section 705 and preamble-replica generation section 707 correspond to a receiving means. Peak-search range determination section 710 and preamble detection section 711 correspond to a preamble detection means.

Antenna 701 receives high frequency signals from communication terminal apparatuses served by HeNB 700 and outputs the received signals to RF section 702.

RF section 702 converts the received high frequency signals into baseband signals by frequency conversion and outputs the baseband signals to CP removing section 703.

CP removing section 703 removes CP from SC-FDMA signals, which corresponds to the received baseband signals, on the basis of predetermined symbol timing. In addition, CP removing section 703 outputs the signals left after the CP removal to DFT section 704.

DFT section 704 performs a discrete Fourier transform on the received SC-FDMA signals and outputs the signals obtained by the discrete Fourier transform to resource demapping section 706.

Control section 705 manages the PRACH parameters. Control section 705 outputs a frequency starting number to resource demapping section 706 and outputs a transmission timing value, logical sequence number, $N_{CS}$ configuration value and high speed flag to preamble replica generation section 707. These PRACH parameters are also managed by FGW 500 as described above.

Resource demapping section 706 extracts a necessary preamble from the SC-FDMA signals received from DFT section 704, on the basis of the frequency starting number received from control section 705. In addition, resource demapping section 706 outputs the extracted preamble to correlation operation section 708.

Preamble-replica generation section 707 generates a preamble replica from the received PRACH parameters and outputs the generated preamble replica to correlation operation section 708.

To put it more specifically, preamble-replica generation section 707 first performs a discrete Fourier transform expressed by equation 8 below on signals obtained by applying the PRACH parameters to equation 7 below. Preamble-replica generation section 707 thus generates a preamble replica in the frequency domain.

(Equation 7)

$$x_{HeNB}(n) = e^{-j\frac{\pi u n(n+1)}{N_{ZC}}}, 0 \leq n \leq N_{ZC} - 1 \qquad [7]$$

(Equation 8)

$$X_{HeNB}(k) = \sum_{n=0}^{N_{ZC}-1} x_{HeNB}(n) \cdot e^{-j\frac{2\pi nk}{N_{ZC}}}, 0 \leq k \leq N_{ZC} - 1 \qquad [8]$$

Correlation operation section 708 performs a correlation operation on the reception preamble received from resource demapping section 706 and the preamble replica received from preamble-replica generation section 707. In addition, correlation operation section 708 outputs a correlation function obtained as a result of the operation to IDFT section 709.

To put it more specifically, correlation operation section 708 calculates correlation function $Z_{HeNB}(k)$ expressed by equation 9 below, where the reception preamble sequence is $Y_{HeNB}(k)$.

$$Z_{HeNB}(k) = Y_{HeNB}(k)X^*_{HeNB}(k), 0 \leq k \leq N_{ZC}-1 \qquad \text{(Equation 9)}$$

IDFT section 709 performs an inverse discrete Fourier transform on the received correlation function and outputs a result obtained by the inverse discrete Fourier transform to preamble detection section 711.

To put it more specifically, IDFT section 709 performs an inverse discrete Fourier transform expressed by equation 10 below on the received correlation function $Z_{HeNB}(k)$ to obtain signals $z_{HeNB}$.

(Equation 10)

$$z_{HeNB}(l) = \sum_{k=0}^{N_{ZC}-1} Z_{HeNB}(k) \cdot e^{j\frac{2\pi kl}{N_{ZC}}}, 0 \leq l \leq N_{ZC} - 1 \qquad [10]$$

Peak-search range determination section 710 determines a range of peak search in a power delay profile and outputs the determined range of peak search to preamble detection section 711.

To put it more specifically, peak-search range determination section 710 is configured to previously acquire cell radius information and thereby finds maximum delay time $T_{MAX}$ of a preamble that is expressed by equation 11 below, where r is a cell radius in [m] and c is the speed of light in [m/sec].

(Equation 11)

$$T_{MAX} = \frac{2r}{c} [sec] \qquad [11]$$

The number of samples $N_{PS}$ in the range of peak search in a power delay profile is expressed by equation 12 below, where $f_S$ is a sampling frequency in [Hz].

(Equation 12)

$$N_{PS} = \lceil T_{MAX} f_S \rceil = \left\lceil \frac{2rf_S}{c} \right\rceil \quad [12]$$

For example, the number of samples $N_{PS}$ is equal to 5 when the cell radius of first HeNB is 20 [m], the sampling frequency is 30.72 [MHz] and the speed of light is 3×108 [m/s].

Preamble detection section 711 performs a preamble detection on the signals received from IDFT section 709, within the range of peak search received from peak-search range determination section 710.

To put it more specifically, preamble detection section 711 converts signals $z_{HeNB}(l)$ received from IDFT section 709 into power delay profile $P_{HeNB}(l)$ expressed by equation 13 below.

$$P_{HeNB}(l)=|z_{HeNB}(l)|^2, 0\le l \le N_{ZC}-1 \quad \text{(Equation 13)}$$

Preamble detection section 711 performs peak search in power delay profile $P_{HeNB}(l)$ while the range of peak search is limited to $0 \le l \le N_{PS}$. As a result, if the peak level of power delay profile $P_{HeNB}(l)$ exceeds a predetermined determination threshold, preamble detection section 711 determines that the preamble has been detected.

Figure 22:
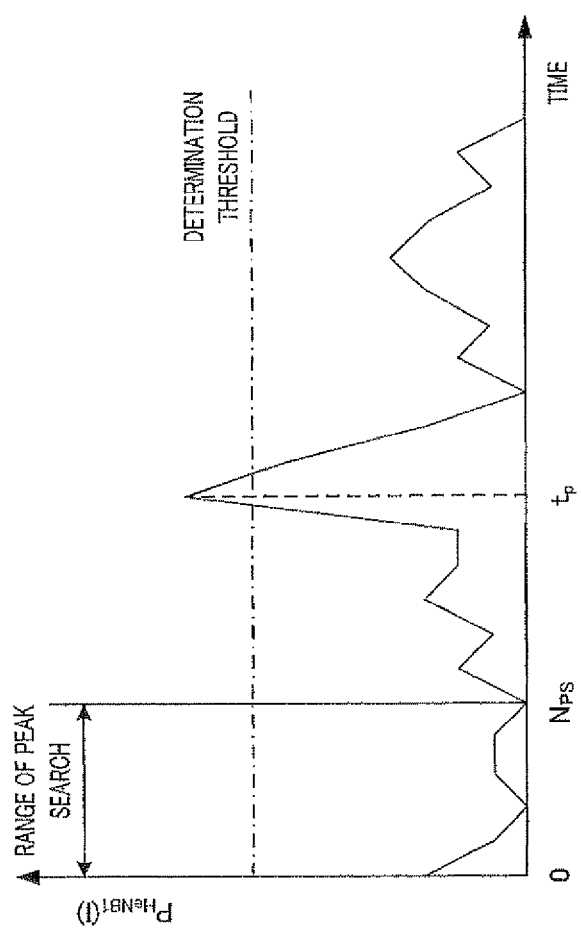
FIG. 22 is a diagram for describing effects of the HeNB according to Embodiment of the present invention.

FIG. 22 is a diagram for describing the effect of limiting the range of peak search in HeNB 700. The horizontal axis represents time and the vertical axis represents the level of power delay profile $P_{HeNB}(l)$. Moreover, FIG. 23 is a diagram illustrating the range of peak search in MeNB 200 for the purpose of comparison.

In FIG. 22, the polygonal line represents an example of a power delay profile in a state where a HUE served by HeNB 700 has not transmitted a preamble yet but a preamble from a different cell was received by HeNB 700 at time $t_p$. In this example, an assumption is made that the power delay profile exceeds the determination threshold in the vicinity of time $t_p$ because of the preamble from the different cell as illustrated in FIG. 22.

Figure 23:
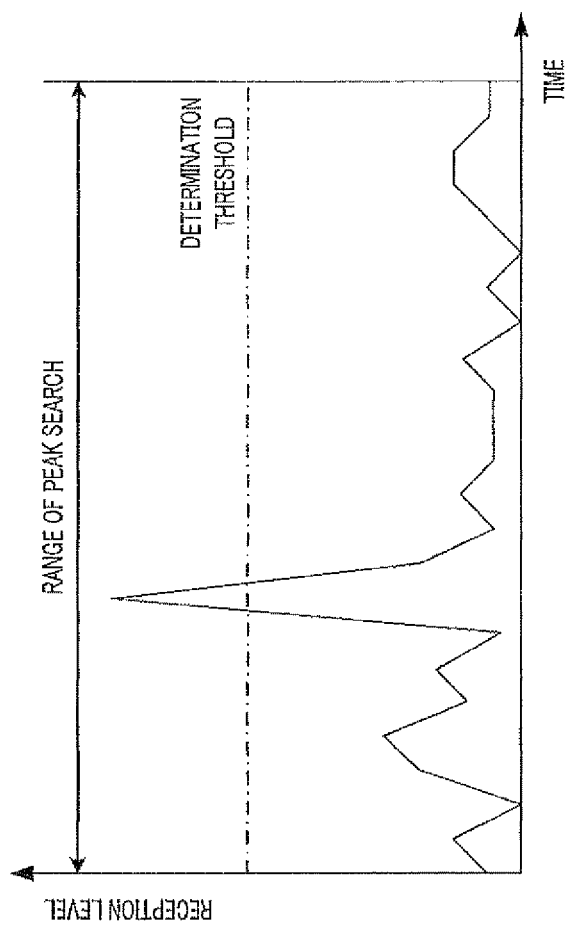
FIG. 23 is a diagram illustrating a range of peak search performed by a MeNB in Embodiment 3 of the present invention.

When the range of peak search in HeNB 700 is wide as in the case of the range of peak search in MeNB 200 illustrated in FIG. 23, HeNB 700 erroneously determines that a preamble has been detected. For this reason, HeNB 700 limits the range of peak search to the range from 0 to $N_{PS}$. Accordingly, HeNB 700 can correctly determine that no preamble has been detected, without detecting the peak at time $t_p$.

Since the cell radius of MeNB 200 is large, a preamble of MUE 210 arrives at MeNB 200 with a large delay from desired arrival timing in some cases. For this reason, MeNB 200 needs to perform peak search in a wide range as illustrated in FIG. 23. On the other hand, the cell radius of HeNB 700 is small, so that delay time of a preamble from a HUE is very short, which, in turn, allows for narrowing the range of peak search as illustrated in FIG. 22.

As described above, HeNB 700 according to Embodiment 3 can reduce erroneous detection of preambles in HeNBs. Accordingly, HeNB 700 allows reduction in uplink transmission power for HUEs, thereby further mitigating inter-cell interference between preambles, while securing predetermined resources. In particular, when combined with Embodiment 1, HeNB 700 according to Embodiment 3 can effectively prevent erroneous detection of preambles from distant MUEs.

The disclosure of the specification, the drawings, and the abstract included in Japanese Patent Application No. 2010-185214, filed on Aug. 20, 2010, is incorporated herein by reference in its entirety.

INDUSTRIAL APPLICABILITY

The network management apparatus, the base station apparatus, and the network management method according to the present invention are useful in that they are capable of mitigating inter-cell interference between preambles while securing predetermined resources.

REFERENCE SIGNS LIST

100 Network system
200 MeNB
210 MUE
300 First HeNB
310 First HUE
320 First cell
400 Second HeNB
410 Second HUE
420 Second cell
500 FGW
510 Communication section
520 Parameter acquisition section
530 Parameter determination section
540 Parameter notification section
700 HeNB
701 Antenna
702 RF section
703 CP removing section
704 DFT section
705 Control section
706 Resource demapping section
707 Preamble-replica generation section
708 Correlation operation section
709 IDFT section
710 Peak-search range determination section
711 Preamble detection section

The invention claimed is:

1. A base station apparatus having a cell coverage at least partially overlapping with a cell coverage of another base station apparatus comprising:
  a receiver structured to receive radio signals; and
  a preamble detector structured to detect an uplink preamble by peak search with respect to the received radio signals, wherein
  the preamble detector includes a processor that limits performance of the peak search within a time range that is shorter than a time range of peak search performed by the another base station apparatus having the at least partially overlapping cell coverage.

2. The base station apparatus according to claim 1, wherein, the receiver further receives a parameter for the uplink preamble from a network management apparatus, the parameter being determined in such a way that transmission sequences of the uplink preambles does not overlap between the base station apparatus and the another base station apparatus.

3. The base station apparatus according to claim 2, wherein, the parameter contains transmission timing information, transmission sequence information and frequency assignment information on the uplink preamble.

4. The base station apparatus according to claim 2, wherein the parameter is determined in such a way that frequency positions of the uplink preambles overlap each other between the base station apparatus and the another base station apparatus when the parameter is determined in such a way that the transmission sequences of the uplink preambles are different from each other.

5. The base station apparatus according to claim 2, wherein the network management apparatus manages a macro base station apparatus and a small cell base station apparatus, and the parameter is determined in such a way that the transmission sequences are different between the macro base station apparatus and the small cell base station apparatus.

6. The base station apparatus according to claim 2, wherein the network management apparatus manages a macro base station apparatus and a plurality of small cell base station apparatuses, and the parameter is determined in such a way that the frequency positions are different between the macro base station apparatus and the plurality of small cell base station apparatuses.

7. A method for operating a base station apparatus having a cell coverage at least partially overlapping with a cell coverage of another base station apparatus comprising:

receiving, by a processor at the base station apparatus, radio signals; and detecting, at the base station apparatus, an uplink preamble by peak search with respect to the received radio signals, wherein the processor controls detecting of the uplink preamble by limiting performance of the peak search within a time range shorter than a time range of peak search performed by the another base station apparatus having the at least partially overlapping cell coverage.

\* \* \* \* \*